(12) United States Patent
Shin et al.

(10) Patent No.: US 8,771,894 B2
(45) Date of Patent: Jul. 8, 2014

(54) COOLING PLATE HAVING IMPROVED FLOW CHANNELS

(75) Inventors: Jae-young Shin, Yongin-si (KR); Jie Peng, Yongin-si (KR); Seung-jae Lee, Yongin-si (KR); Tae-won Song, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 732 days.

(21) Appl. No.: 11/684,247

(22) Filed: Mar. 9, 2007

(65) Prior Publication Data

US 2008/0008916 A1    Jan. 10, 2008

(30) Foreign Application Priority Data

Jul. 10, 2006 (KR) ................. 10-2006-0064473

(51) Int. Cl.
*H01M 8/04* (2006.01)

(52) U.S. Cl.
USPC .......................................... 429/437; 429/434

(58) Field of Classification Search
USPC ................................ 429/26, 433–434
See application file for complete search history.

(56) References Cited

U.S. PATENT DOCUMENTS

| | | | |
|---|---|---|---|
| 5,922,485 A * | 7/1999 | Enami ............................... 429/26 |
| 6,406,809 B1 * | 6/2002 | Fujii et al. ........................ 429/34 |
| 6,663,992 B2 | 12/2003 | Lehnert et al. |
| 6,866,955 B2 | 3/2005 | Lee et al. |
| 2003/0129475 A1 * | 7/2003 | Enjoji et al. ..................... 429/38 |
| 2003/0203260 A1 | 10/2003 | Lee |
| 2005/0031934 A1 * | 2/2005 | Tanaka et al. ................... 429/35 |
| 2005/0260472 A1 | 11/2005 | Rapaport et al. |
| 2006/0046117 A1 | 3/2006 | Suh |
| 2008/0305374 A1 * | 12/2008 | Toro ................................ 429/26 |

FOREIGN PATENT DOCUMENTS

| | | |
|---|---|---|
| CN | 1650458 A | 8/2005 |
| JP | 60-109180 | 6/1985 |
| JP | 63-241875 | 10/1988 |
| JP | 2001-110434 A | 4/2001 |
| JP | 2005-251699 A | 9/2005 |
| JP | 2006-73528 A | 3/2006 |
| JP | 2006-147337 | 6/2006 |
| JP | 2006-164545 A | 6/2006 |
| WO | WO 2004/031677 A1 | 4/2004 |

OTHER PUBLICATIONS

First Office Action issued in Chinese Patent Application No. 2007100077060 on Oct. 24, 2008.
Chinese Office Action issued on Apr. 13, 2010, in corresponding Chinese Patent Application No. 200710007706.
Japanese Office Action Dated Dec. 11, 2012.
Japanese Office Action dated Jul. 30, 2013.

* cited by examiner

*Primary Examiner* — Ula C Ruddock
*Assistant Examiner* — Jacob Marks
(74) *Attorney, Agent, or Firm* — Lee & Morse, P.C.

(57) ABSTRACT

A cooling plate in which flow channels are modified to reduce temperature differences between portions of the cooling plate and provide for more uniform heat distribution within a heat generator. The flow channels of the cooling plate are formed such that a central portion of the flow channels has a greater volume than the end portions near an inlet and an outlet so that the amount of cooling water that is contained in the central portion at any one time is larger than either of the end portions near the inlet and the outlet. Likelihood of thermal deformation of the cooling plate due to thermal stress is decreased, and stability of performance of the fuel cell is increased.

23 Claims, 10 Drawing Sheets

COOLING PLATE HAVING IMPROVED FLOW CHANNELS

CROSS-REFERENCE TO RELATED PATENT APPLICATIONS

This application claims the benefit of Korean Application No. 2006-64473, filed Jul. 10, 2006, in the Korean Intellectual Property Office, the disclosure of which is incorporated herein in its entirety by reference.

BACKGROUND OF THE INVENTION

1. Field of the Invention

Aspects of the present invention relate to a cooling plate used for cooling a fuel cell, and more particularly, to a cooling plate in which flow channels are improved to reduce temperature differences between portions of the cooling plate.

2. Description of the Related Art

A fuel cell is an electric generator that changes chemical energy of a fuel into electrical energy through a chemical reaction, and the fuel cell can continuously generate electricity as long as the fuel is supplied. FIG. 1 is a schematic drawing illustrating the energy transformation structure of a fuel cell. Referring to FIG. 1, when air that includes oxygen is supplied to a cathode 1 and a fuel containing hydrogen is supplied to an anode 3, electricity is generated as an electrolyte membrane 2 allows hydrogen ions to flow from the anode 3 to the cathode 1 through the electrolyte membrane 2 while electrons are forced to flow through a circuit, which produces usable energy. However, generally, a single unit cell 10 does not produce enough electricity to be useful. Therefore, as depicted in FIG. 2, electricity is generated by a fuel cell stack 20 in which a plurality of unit cells 10 is connected in series.

Accordingly, as depicted in FIG. 2, when hydrogen and oxygen are supplied through an endplate 21 of the fuel cell stack 20, corresponding materials are supplied to corresponding electrodes and circulated through each of the unit cells 10. Of course, as described above, hydrogen is supplied in the form of a chemical fuel, and oxygen is supplied in the form of air.

In the electrochemical reaction, heat is generated as well as electricity. Therefore, for a smooth operation of a fuel cell, the fuel cell must be continuously cooled by removing heat. For this purpose, in the fuel cell, as depicted in FIG. 2, a heat exchanger 30 is provided and a cooling plate 5 is mounted on every fifth to sixth unit cell 10 in the fuel cell stack 20. The cooling water flows from the heat exchanger 30 through a valve 50 to the fuel cell stack 20 where the cooling water absorbs heat. The cooling water absorbs heat in the fuel cell stack 20 while passing through flow channels 5a (refer to FIG. 3) of the cooling plate. The cooling water returns 40, after having absorbed heat from the fuel cell stack 20 to the heat exchanger 30 to release the absorbed heat before returning to the fuel cell stack 20 again.

Referring to FIG. 3, in each of the unit cells 10 stacked in the fuel cell stack 20, a bipolar plate 4 includes surface flow channels 4a for supplying and recovering hydrogen or oxygen to and from the cathode 1 and the anode 3, and the surface flow channels 4a are connected to each other. The bipolar plate 4 is configured about a polymer electrolyte membrane 2 that only allows positively charged ions to pass. The cooling plate 5 is illustrated as being adjacent to the bipolar plate 4 and polymer electrolyte membrane 2. The cooling water flows into the cooling plate 5 through a plurality of flow channels 5a, absorbing heat, and then back out of the cooling plate 5.

However, if the temperatures of portions of the cooling plate as depicted in FIG. 4 are measured during the cooling process a central portion 5a-2 of the cooling plate 5 where the heat absorption action is the highest has the highest temperature, and an inlet 5a-1 and an outlet 5a-3, where the cooling water enters and leaves, have lower temperatures. This temperature distribution is natural because after cooling water cooled at the heat exchanger 30 enters through the inlet 5a-1, the cooling water absorbs a large amount of heat while passing through the central portion 5a-2, and a small amount of heat dissipates from the cooling water after passing the central portion 5a-2 prior to leaving through the outlet 5a-3. However, having a large temperature difference between the central portion and the both end portions causes problems with regard to generated current density. According to the actual temperature measurement results, as depicted in FIG. 4, the temperature in the central portion of the cooling plate 5 reaches approximately 150° C., the temperature at the inlet 5a-1 reaches approximately 135° C., and the temperature at the outlet reaches approximately 140° C. That is, a temperature difference of 10-15° C. is generated in a single cooling plate 5. When the temperature difference is large, there is a possibility of deformation of the cooling plate 5 due to thermal stress. Above all, the large temperature difference can adversely affect the electrochemical reaction of the adjacent unit cells 10. When the temperature difference is large, resistance in portions of the electrolyte membrane 2 in the unit cells 10 varies resulting in large current density deviations, thereby generating electricity having a non-stable voltage.

Accordingly, in order to solve this problem, there is a need to develop a new type of cooling plate that can minimize the temperature difference in a single cooling plate 5 of a corresponding unit cell 10.

SUMMARY OF THE INVENTION

Aspects of the present invention provide a cooling plate in which flow channels for cooling water are modified so that temperature difference between portions of the cooling plate can be reduced.

According to an aspect of the present invention, there is provided a cooling plate in which flow channels for flowing cooling water that absorb heat from a heat generator are formed, wherein the flow channels are formed such that a central portion of the flow channels has a greater volume than the end portions near an inlet and an outlet so that the amount of cooling water that passes through the central portion is larger than the amount of cooling water that passes through the end portions near the inlet and outlet.

The end portion near the outlet may have flow channels having a volume greater than that of the end portion near the inlet.

The flow channels may be mounted so that the cooling water flows vertically from the inlet to the outlet to cool heat generated during an energy transformation process in the unit cell.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
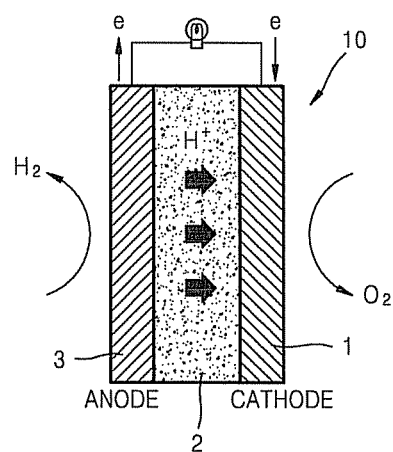
FIG. 1 is a schematic drawing illustrating the principle of electricity generation of a conventional fuel cell.
Figure 2:
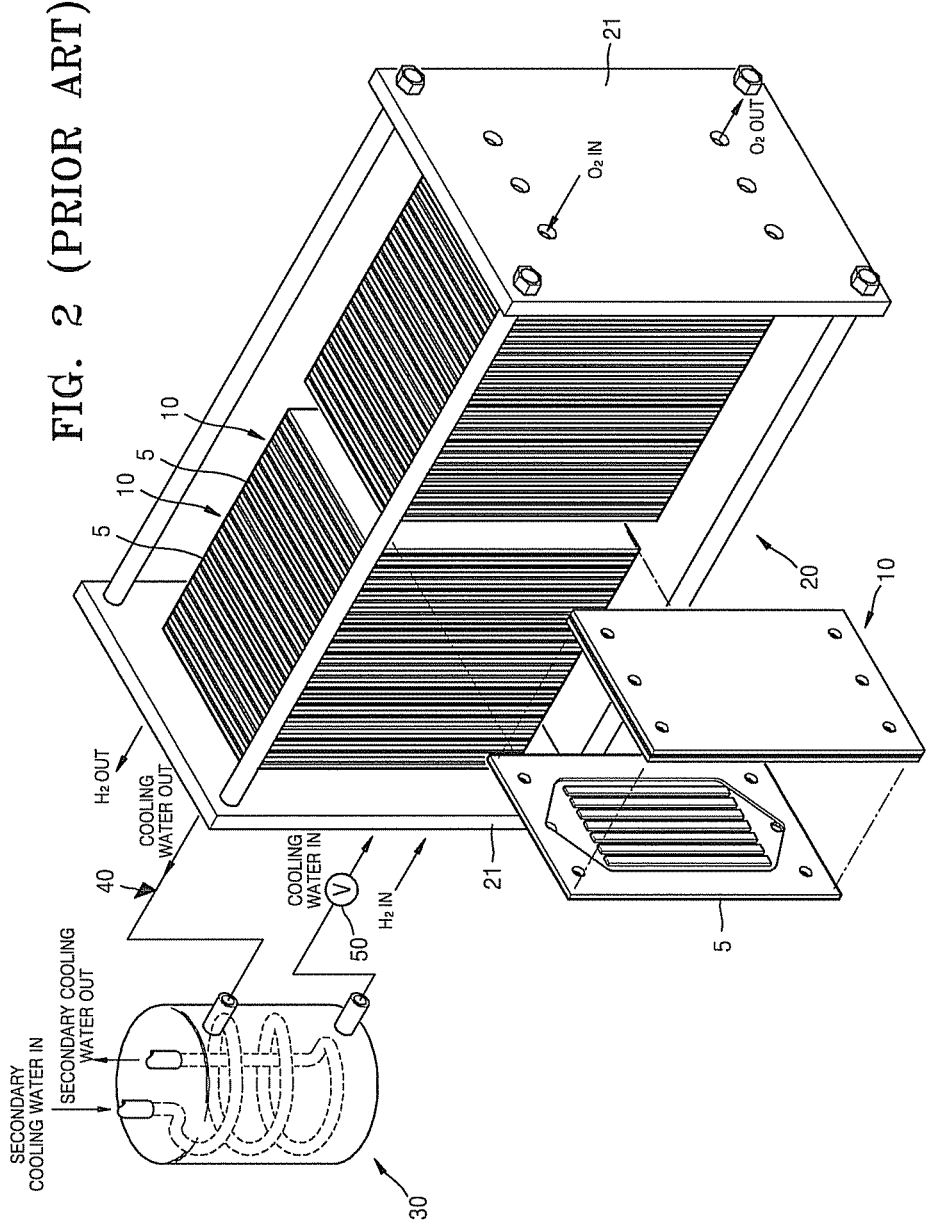
FIG. 2 is a perspective view illustrating a fuel cell stack having a conventional cooling plate.
Figure 3:
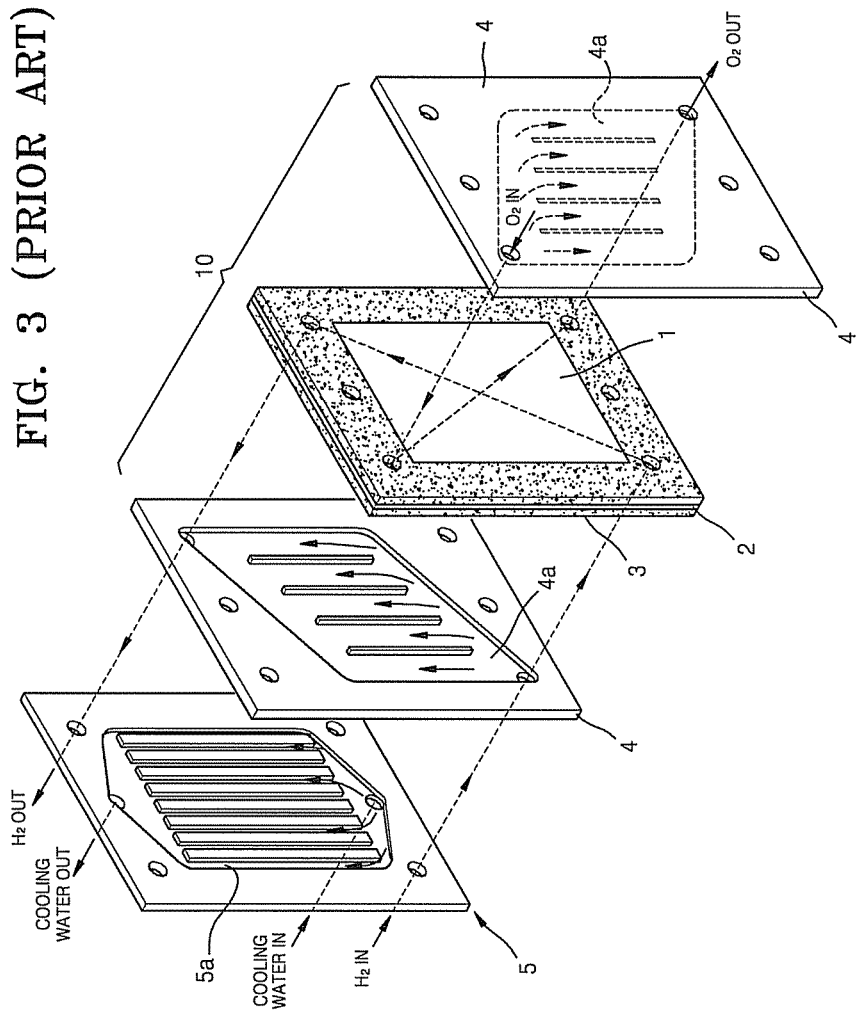
FIG. 3 is an exploded perspective view illustrating a material circulating structure in a unit cell of a stack of the fuel cell of FIG. 2.
Figure 4:
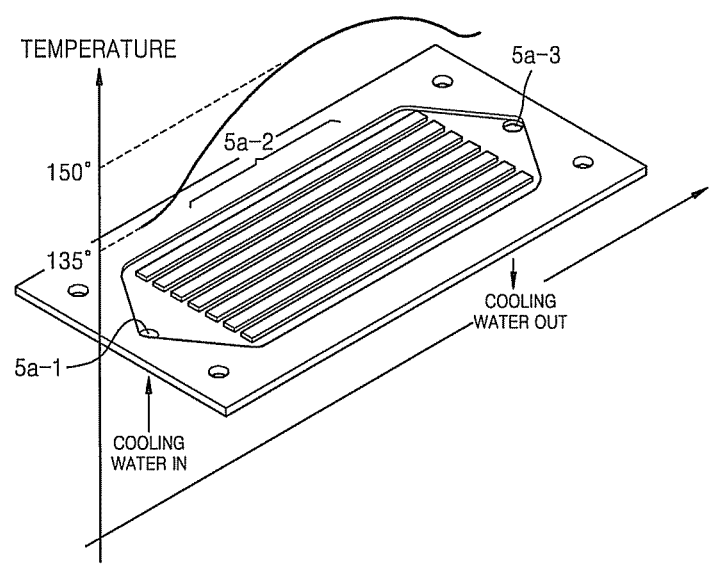
FIG. 4 is a diagram showing a temperature distribution of the cooling plate of FIG. 2.

Reference will now be made in detail to the present embodiments of aspects of the present invention, examples of which are illustrated in the accompanying drawings, wherein like reference numerals refer to the like elements throughout. The embodiments are described below in order to explain different aspects of the present invention by referring to the figures.

Figure 5:
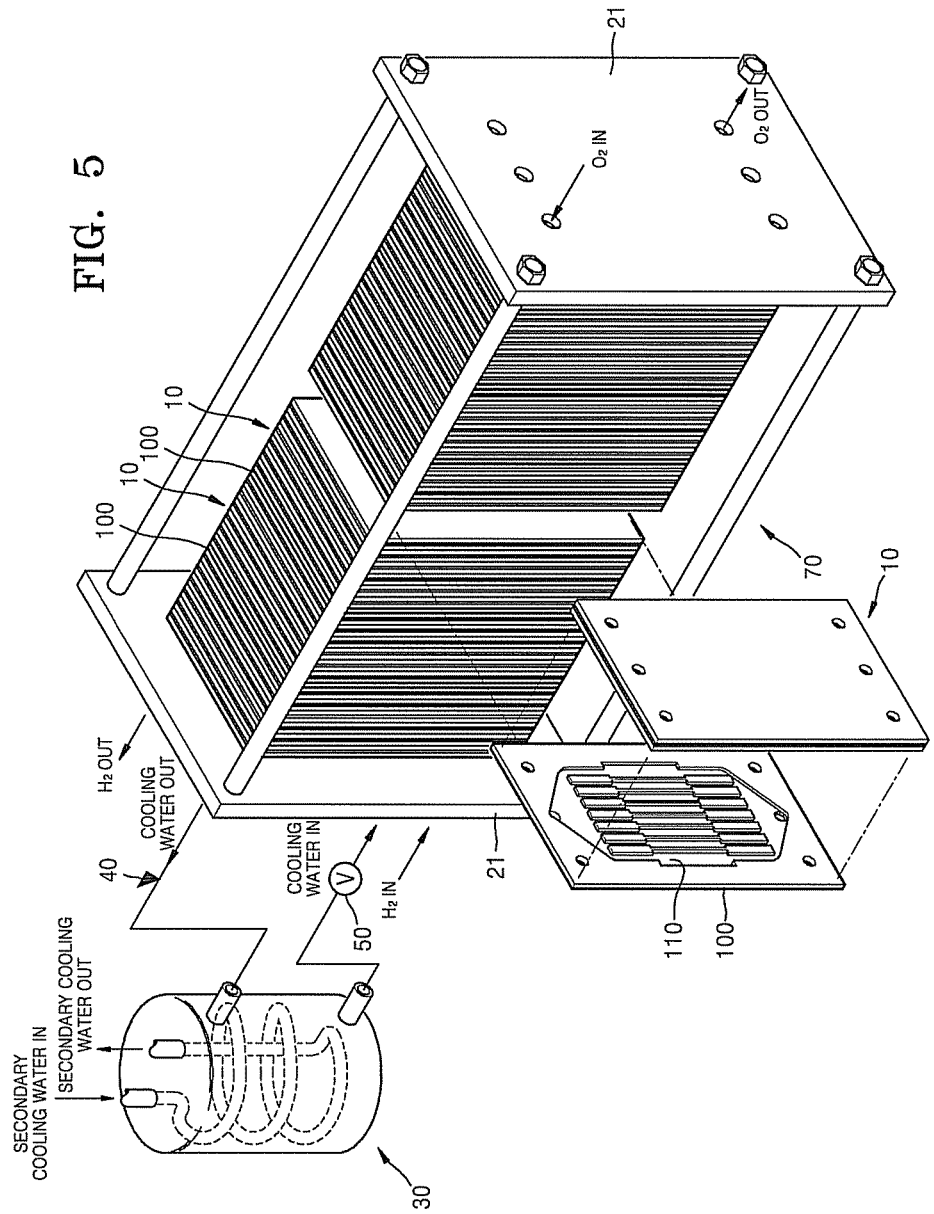
FIG. 5 is a perspective view illustrating a fuel cell stack employing a cooling plate according to an embodiment of the present invention.
Figure 6:
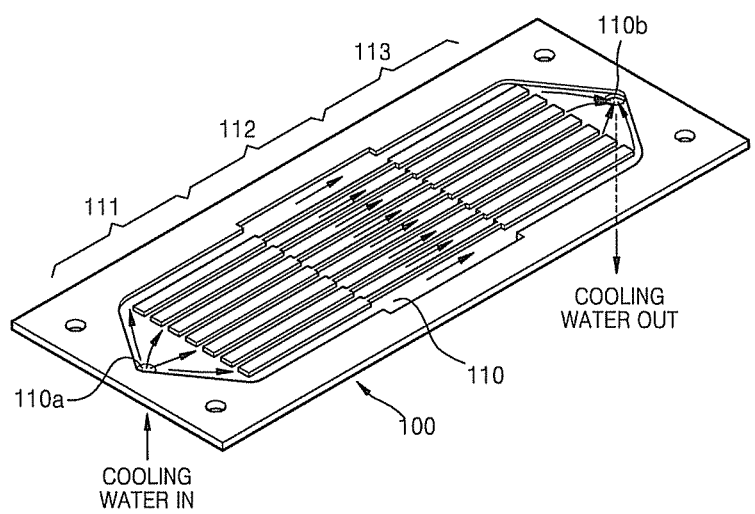
FIG. 6 is an enlarged view of the cooling plate of FIG. 5, according to an embodiment of the present invention.

FIG. 5 is a perspective view illustrating the structure of a fuel cell stack 70 of a fuel cell employing a cooling plate 100 according to an embodiment of the present invention, and FIG. 6 is an enlarged view of the cooling plate 100 of FIG. 5.

Referring to FIG. 5, the cooling plate 100 is mounted on the fuel cell stack 70 to allow cooling water to flow through flow channels 110 of the cooling plate 100 and functions to absorb heat from a heat generator, in this case, the fuel cell stack 70, which is a stack of many unit fuel cells 10 arranged in series. Hydrogen and oxygen are supplied to the anodes and cathodes, respectively, of the individual unit cells 10 through endplates 21. In the fuel cell stack 70, a plurality of cooling plates 100 is spread throughout the fuel cell stack 70 at about every fifth to sixth unit cell 10. Cooling water controlled by valve 50 enters the fuel cell stack 70. Then, cooling water having entered through an inlet 110a of each cooling plate 100 absorbs heat from a unit cell 10 of the fuel cell while flowing through the flow channels 110, and exits the cooling plate 100 through an outlet 110b (shown in FIG. 6). The cooling water generally flows vertically from the inlet 110a of each cooling plate 100 to the outlet 110b of each cooling plate 100 so as to take advantage of natural or free convection within the cooling plate 100. The cooling water returns 40 to the heat exchanger 30 so as to be cooled and re-circulated. Generally, water is used in the cooling plate 100, but oils or organic solvents are also useable.

However, as can be clearly seen in FIG. 6, in the cooling plate 100, according to an embodiment of the present invention, the flow channels 110 are not formed in straight lines like in the related art, but are formed to have different volumes in different portions of the cooling plate 100. In the aspect of this invention, a central portion 112 has a greater width than the end portions 111 and 113 so that the central portion 112 can accommodate more cooling water than the end portions 111 and 113. In this aspect, the central portions 112 of the flow channels 110 have a different width resulting in a different volume from the end portions 111 and 113 to allow the central region to have more cooling capacity since a larger volume of cooling water in the central portion 112 contacts a larger surface area than at the end portions 111 and 113. That is, the width of the central portion 112 is formed greater than those of the end portions 111 and 113, which are near the inlet 110a and outlet 110b, to accommodate more cooling water in the central portion 112, thereby increasing the cooling capacity of the central portion 112. By varying the width of the flow channel 110, the volume of water within a cross-section of the central portion 112 can be greater than that of the end portion 111 near the inlet 110a and that of the end portion 113 near the outlet 110b, which allows for more absorption of energy from the cooling plate 100. Also, because of the greater cross-sectional area through which to flow, the water that flows through the central portion 112 of flow channel 110 will flow more slowly than the water flowing through the end portions 111 and 113, thereby absorbing more energy from the cooling plate 100. Therefore, because the central portion 112 of the flow channel 110 allows for more cooling water to contact the cooling plate 100 for a longer amount of time, the cooling water absorbs a larger amount of heat from the cooling plate 100. Having a greater heat absorption capacity in the central portion 112 of the flow channel 110 than at the end portions 111 and 113 allows for the most heat to be removed from the central portion 112 and is advantageous as the central portion 112 is the greatest heat generating area of the fuel cell stack 70; thus, temperature variations throughout the unit cells 10 and the fuel cell stack 70 are decreased.

Figure 7:
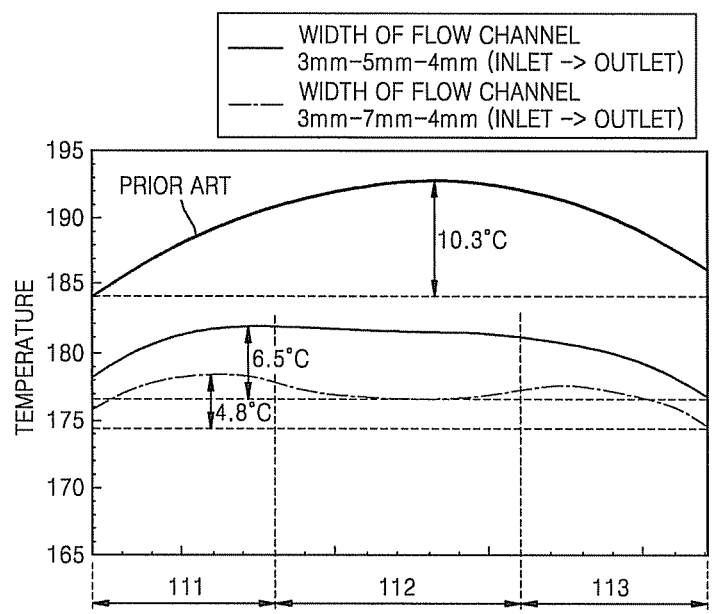
FIGS. 7 through 10 are graphs showing the simulation results of temperature distributions between portions of the cooling plate of FIG. 5 by changing different variables, according to embodiments of the present invention.

FIG. 7 is graph showing a simulation demonstrating temperature of the cooling plate 100 versus position in each portion of the cooling plate 100, end portion 111, central portion 112, and end portion 113, respectively, when the cooling plate 100 comprises flow channels 110 of varying width. In FIG. 7, the solid line represents the temperature distribution along the length of the cooling plate 100 when the end portion 111, the central portion 112, and the end portion 113 have widths of 3, 5, and 4 mm, respectively. The dotted line indicates the temperature distribution along the length of cooling plate 100 when the widths of the flow channel 110 are 3, 7, and 4 mm for the end portion 111 near the inlet 110a, the central portion 112, and the end portion 113 near the outlet 110b, respectively. The heavy solid line, labelled PRIOR ART, indicates the temperature distribution associated with the related art. Through comparison of the related art data and the solid and dotted line data, FIG. 7 demonstrates that when the width of the flow channel 110 is varied throughout the length of the cooling plate 100, the temperature is more uniform along the length of the cooling plate 100 than when the width of the flow channel 110 is not varied. This effect is the result of increased cooling capacity in the central portion 112 due to the increased width of the flow channel 110.

Furthermore, the temperature differences between the maximums and minimums for the curves representing flow channels 110 with varied width are about half that of the related art. Specifically, the difference between the maximum temperature and the minimum temperature for the related art is 10.3° C.; whereas, the temperature differences for the flow channel 110 with a 5 mm central portion 112 and the flow channel 110 with a 7 mm central portion 112 are 6.5° C. and 4.8° C., respectively. Accordingly, the possibilities of deformation due to thermal stress or generating a current density difference due to resistance change can be greatly reduced when compared to related art since the temperature difference between the portions is so drastically reduced with respect to the related art.

Figure 8:
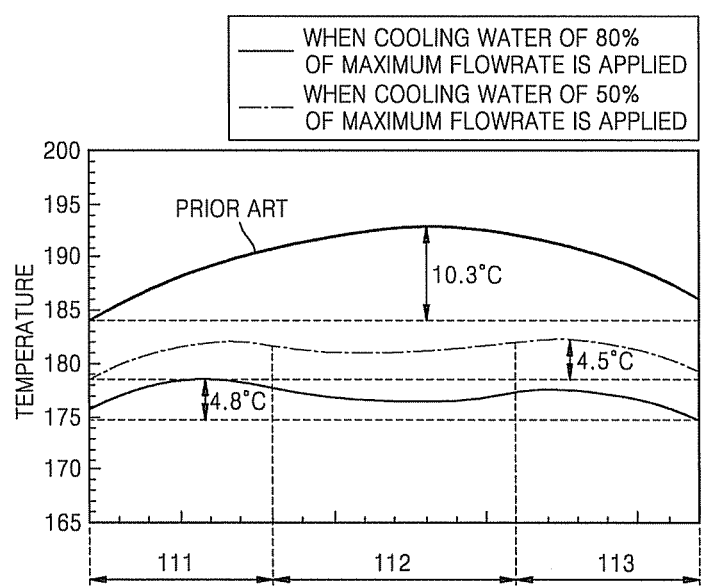

FIG. 8 is a graph demonstrates the impact of varying the flow rate of cooling water through the flow channel 110 on the effectiveness of the varied width of the flow channel 110 and illustrates the results along with the temperature distribution of the related art. The flow channel 110 of FIG. 8 comprises widths of 3 mm, 7 mm, and 4 mm for the end portion 111 near the inlet 110a, the central portion 112, and the end portion 113 near the outlet 110b, respectively of. The heavy solid line, labelled PRIOR ART, indicates the temperature distribution of temperatures of the cooling plate 100 along the length of the cooling plate 5 for the state of the related art. The solid line demonstrates the temperature distribution of temperatures of the cooling plate 100 along the length of the cooling plate 100 along flow channel 110 when the flow rate is 80% of the maximum flow rate. The dotted line represents the temperature distribution of temperatures of the cooling plate 100 along the length of the cooling plate 100 along flow channel 110 when the flow rate is 50% of the maximum flow rate. FIG. 8 demonstrates, through the shapes of the curves representing the flow channels 110 with varied widths, that flow rate does not affect the general shape of the curves or that the temperature distribution along the length of the flow channel 110 is dependent upon the shape of the flow channel 110 instead of the flow rate. Furthermore, FIG. 8 indicates that, although the operating temperature for the lower flow rate (50% maximum) is greater than that of the higher flow rate (80% maximum), the lower flow rate had a lesser temperature difference between the maximum and minimum temperatures throughout the cooling plate 100. Regardless, both the 50% and 80% maximum flow rates exhibit less than half of the temperature difference between the maximum and minimum shown in the related art.

Figure 9:
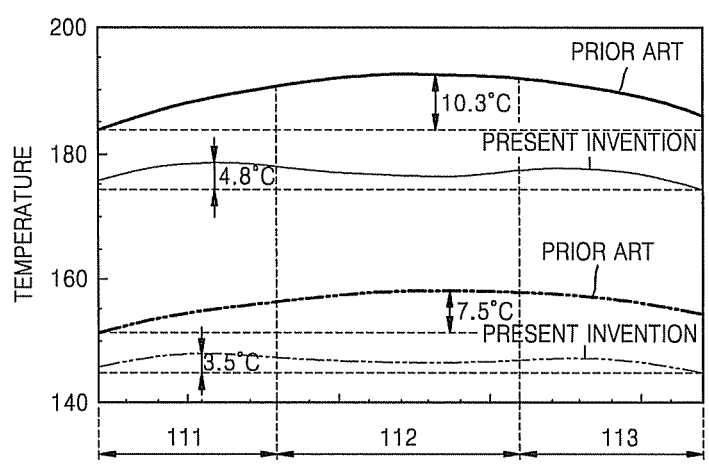

FIG. 9 is a graph depicting a simulation result that demonstrates the effect of different heat fluxes on the temperature of the cooling plate 100 throughout the length of the cooling plate 100 and flow channel 110 and compares such against the related art's cooling plate 5. The flow channel 110 used for the production of FIG. 9 has dimensions of 3 mm, 7 mm, and 4 mm for the end portion 111, the central portion 112, and the end portion 113, respectively. Heat flux is a unit that indicates heat flow per unit area and can have the units of $Btu \cdot ft^{-2} \cdot hr^{-1}$ or $J \cdot m^{-2} \cdot s^{-1}$. The solid lines represent the temperature distributions along the length of the cooling plates when the cooling plates are subjected to a larger heat flux; whereas, the dotted lines represent the temperature distributions along the length of the cooling plates when the cooling plates are subjected to a smaller heat flux. As is shown, the smaller heat flux results in a more uniform temperature distribution throughout the length of the cooling plate 100. Also, when the cooling plates are subjected to a smaller heat flux, the operating temperatures of the fuel cell stacks are decreased. FIG. 9 also demonstrates that when the flow channel within the cooling plate is of varied width, the operating temperatures of the cooling plates are less than that of the related art and the temperature distributions are more uniform than the related art. Regardless of the effect of heat flux on the temperature, the temperature distributions are of the same general shape and illustrate the more uniform temperature throughout the fuel cell stack. Generally, the cooling plate 100 is constructed from a graphite material. And, the cooling plate 100 may have a heat or thermal conductivity of about 30 to 150 $W \cdot m^{-1} \cdot K^{-1}$.

Accordingly, as a summary of the simulation results, it is seen that, when the volume of the central portion 112 of the flow channel 110 is greater than the end portions 111 and 113, the temperature difference between the maximum and the minimum temperatures throughout the length of the cooling plate 100 is about half of that of the related art resulting in a more uniform temperature distribution along the length of the cooling plate 100.

Figure 10:
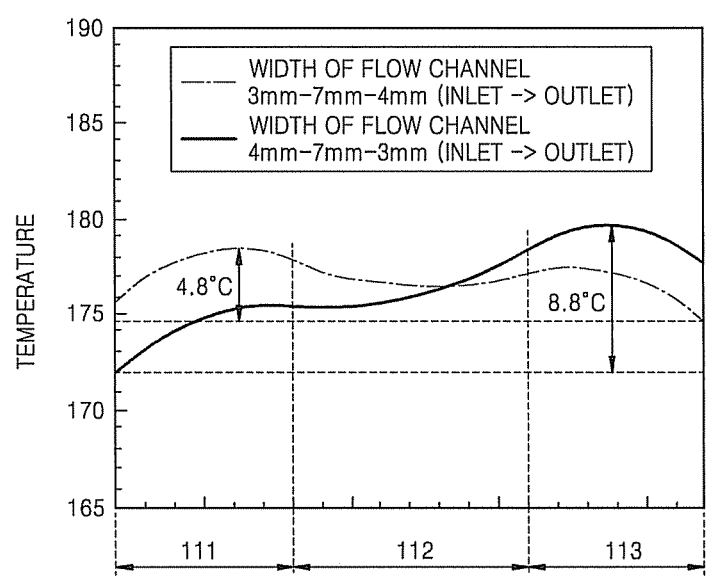

Another embodiment of the current invention demonstrates that the volume of the flow channels 110 in the end portion 111 near the inlet 110a can also be formed greater than the end portion 113 near the outlet 110b. However, in this case, as the simulation result shown in FIG. 10, the temperature in the end portion 113 near the outlet 110b increases and results in a greater temperature distribution throughout the length of the cooling plate 100 and a less uniform temperature distribution. The overall temperature difference increases to approximately 8-9° C. The results indicate that in the end portion 111 of the flow channel 110 the temperature increases as the cooling water initially absorbs heat energy from the cooling plate 100. When the cooling water enters the central portion 112, the temperature slightly decreases but then increases. Such an increase in temperature in the central portion 112 is the result of the end portion 113 being smaller than both of the end portion 111 and the central portion 112 as the flow of the cooling water is substantially decreased due to the narrowing of the flow channel 110 in the end portion 113. Thus, the flow of the cooling water in central portion 112 slows down as the cooling water approaches the narrower end portion 113, and the cooling water is afforded more time in central portion 112 to absorb heat energy from the cooling plate 100 before passing into the end portion 113 of the flow channel 110. Even so, the overall temperature difference is still less than that of the related art. However, it is found that, to minimize the temperature difference in the cooling plate 100, the volumes of the flow channels 110 may be formed in the order of the central portion 112 being greater than the end portion 113 near the outlet 110b, which is greater than the end portion 111 near the inlet 110a.

In the aspects of the present invention herein, the volumes of the flow channels 110 are modified by changing the widths of the flow channels 110, but the present invention is not limited thereto. That is, the volumes of the flow channels 110 may also be modified by varying depth, cross-sectional shape, or length of the flow channels 110.

The cooling plate according to aspects of the present invention provides the following advantages and/or other:

First, the possibility of thermal deformation of the cooling plate due to thermal stress is decreased by reducing the temperature differences in the different portions of the cooling plate by modifying the volumes of flow channels through which the cooling water passes.

Second, since the temperature is made more uniform throughout the cooling plate, the electrical resistance within the heat generator is also made more uniform. Thus, the application to which the cooling plates are applied, be it a heat generator, fuel cell stack, or any other object to be cooled, will provide more stable and reliable performance.

Third, the cooling plate exhibiting the flow channels with varying width will increase the durability of the components of the plate or the fuel cell stack and the durability of a membrane electrode assembly (MEA) as the thermal stress throughout the structure will be decreased and the components will have a more uniform temperature distribution.

Fourth, a more uniform temperature distribution throughout the components of the fuel cell stack results in a more stable current density.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cooling plate, comprising:
   an inlet;
   an outlet; and
   flow channels extending between the inlet and the outlet, such that a coolant flows into the inlet, through the flow channels, and out of the outlet, to absorb heat from a heat generator, the flow channels being defined by flow channel walls extending continuously between the inlet and the outlet, wherein,
   each of the flow channels has a first end portion adjacent to the inlet, a second end portion adjacent to the outlet, and a central portion extending-between the first end portion and the second end portion, and
   the central portion of each of the flow channels has a larger width-wise cross-sectional area than the second end portion and a larger width-wise cross-sectional area than the first end portion, and
   the flow channel walls each have a central portion, and a first end portion and a second end portion continuous with the central portion, wherein the central portion, the first end portion and second end portion of the flow channel walls correspond to the central portion, first end portion and second end portion of the flow channels, and
   the central portion of each of the flow channel walls has a lesser thickness in a width direction than the second end portion and the first end portion of the flow channel walls.

2. The cooling plate of claim 1, wherein the first end portion has a greater volume than the volume of the second end portion.

3. The cooling plate of claim 1, wherein the coolant comprises water.

4. The cooling plate of claim 1, wherein the flow channels are arranged so that the coolant flows vertically from the inlet to the outlet.

5. The cooling plate of claim 1, wherein the heat generator comprises a unit fuel cell.

6. The cooling plate of claim 1, wherein the heat generator comprises a fuel cell stack.

7. The cooling plate of claim 1, wherein the cooling plate comprises a material with a high heat conductivity.

8. The cooling plate of claim 6, wherein a temperature distribution along the cooling plate varies by less than about 5° C. during operation of the fuel cell stack.

9. The cooling plate of claim 8, wherein the temperature distribution along the cooling plate varies by less than about 4° C. during operation of the fuel cell stack.

10. The cooling plate of claim 9, wherein the temperature distribution along the cooling plate varies by less than about 3.5° C. during operation of the fuel cell stack.

11. The cooling plate of claim 1, wherein the width of the first end portion is not equal to the width of the second end portion.

12. The cooling plate of claim 1, wherein at least some of the flow channels vary in width such that the central portion has a greater width than the second end portion, which has a greater width than the first end portion.

13. The cooling plate of claim 12, wherein the central portion has a width of 5 mm, the second end portion has a width of 4 mm, and the first end portion has a width of 3 mm.

14. The cooling plate of claim 12, where in the central portion has a width of 7 mm, the second end portion has a width of 4 mm, and the first end portion has a width of 3 mm.

15. A fuel cell stack, comprising:
   a plurality of unit cells, each unit cell comprising an anode supplied with a hydrogen-rich fuel, a cathode supplied with an oxidizer, and an electrolyte membrane, the anode being arranged about a first side of the electrolyte membrane and the cathode being arranged about a second side of the electrolyte membrane; and
   a plurality of cooling plates interposed amongst the plurality of unit cells, wherein the cooling plates include at least one cooling plate according to claim 1.

16. The fuel cell stack of claim 15, wherein the plurality of cooling plates is interposed amongst the plurality of unit cells such that adjacent individual cooling plates are separated by about six unit cells.

17. The fuel cell stack of claim 15, wherein the plurality of cooling plates is interposed amongst the plurality of unit cells such that adjacent individual cooling plates are separated by fewer than six unit cells.

18. A cooling plate, comprising:
   an inlet;
   an outlet; and
   flow channels extending between the inlet and the outlet, such that a coolant flows into the inlet, through the flow channels, and out of the outlet, to absorb heat from a heat generator, wherein,
   each of the flow channels has a first end portion adjacent to the inlet, a second end portion adjacent to the outlet, and a central portion extending therebetween, the central portion having a larger width-wise cross-sectional area than the second end portion and a larger width-wise cross-sectional area than the first end portion,
   a total volume of the central portions of all of the flow channels is greater than a total volume of the first end portions of all of the flow channels and is greater than a total volume of the second end portions of all of the flow channels, and
   the flow channels are separated by flow channel walls that extend between the inlet and the outlet, the flow channel walls having a lesser thickness in a region corresponding to the central portion of the flow channels than in a region corresponding to the first end portion of the flow channels or a region corresponding to the second end portion of the flow channels.

19. The cooling plate of claim 18, wherein the heat generator comprises a unit fuel cell.

20. The cooling plate of claim 18, wherein the heat generator comprises a fuel cell stack.

21. The cooling plate of claim 18, wherein the plurality of flow channels increases the uniformity of a temperature distribution across the heat generator.

22. A fuel cell stack, comprising:
   a plurality of unit cells, each unit cell comprising an anode supplied with a hydrogen-rich fuel, a cathode supplied with an oxidizer, and an electrolyte membrane;
   the anode arranged about a first side of the electrolyte membrane and the cathode arranged about a second side of the electrolyte membrane; and
   a plurality of cooling plates interposed amongst the plurality of unit cells, wherein the cooling plates include at least one cooling plate according to claim 18.

23. The fuel cell stack of claim 22, wherein each individual flow channel in the plurality of flow channels is formed having different widths along a length direction thereof.

* * * * *